(12) United States Patent
Lundberg et al.

(10) Patent No.: US 8,208,033 B2
(45) Date of Patent: Jun. 26, 2012

(54) VIDEO OVER ETHERNET

(75) Inventors: Stefan Lundberg, Lund (SE); Jon Hansson, Kristianstad (SE)

(73) Assignee: Axis AB, Lund (SE)

( * ) Notice: Subject to any disclaimer, the term of this patent is extended or adjusted under 35 U.S.C. 154(b) by 392 days.

(21) Appl. No.: 12/500,249

(22) Filed: Jul. 9, 2009

(65) Prior Publication Data

US 2010/0007750 A1 Jan. 14, 2010

Related U.S. Application Data

(60) Provisional application No. 61/081,854, filed on Jul. 18, 2008.

(30) Foreign Application Priority Data

Jul. 11, 2008 (EP) .................................. 08160224

(51) Int. Cl.
*H04N 5/225* (2006.01)
*H04L 25/02* (2006.01)

(52) U.S. Cl. ..................................... 348/211.3; 375/216

(58) Field of Classification Search .................. 725/105; 348/211.3; 370/297, 529; 375/216
See application file for complete search history.

(56) References Cited

U.S. PATENT DOCUMENTS

| | | | |
|---|---|---|---|
| 5,642,151 A | 6/1997 | Nusbickel et al. | |
| 6,212,238 B1 * | 4/2001 | Chambers | ..................... 375/216 |
| 2002/0066115 A1 | 5/2002 | Wendelrup | |
| 2004/0136388 A1 | 7/2004 | Schaff | |
| 2004/0250174 A1 | 12/2004 | Sterrantino et al. | |
| 2005/0066210 A1 | 3/2005 | Chen | |
| 2006/0098638 A1 | 5/2006 | Binder | |
| 2006/0257135 A1 * | 11/2006 | Kawada | ........................ 396/301 |
| 2006/0282561 A1 * | 12/2006 | Dickens et al. | .................. 710/33 |
| 2006/0282872 A1 * | 12/2006 | Cirstea et al. | ................. 725/131 |
| 2007/0019947 A1 * | 1/2007 | Shimada | ....................... 396/329 |
| 2007/0245393 A1 * | 10/2007 | Fernandez | .................... 725/118 |
| 2008/0228969 A1 * | 9/2008 | Cheah et al. | .................... 710/69 |
| 2009/0086955 A1 * | 4/2009 | Morrill | .................... 379/220.01 |

(Continued)

FOREIGN PATENT DOCUMENTS

JP 2003338971 A 11/2003

(Continued)

OTHER PUBLICATIONS

IEEE Computer Society, "IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications", IEEE Std 802.3-2005 (Dec. 9, 2005).

Kakimura et al., "A Real-Time MPEG1 Ethernet Camera System", IEEE Transactions on Consumer Electronics, vol. 45, No. 3, (Aug. 1, 1999).

(Continued)

*Primary Examiner* — Jason Whipkey
(74) *Attorney, Agent, or Firm* — Volpe and Koenig, P.C.

(57) ABSTRACT

The present invention relates to a network enabled digital video camera arranged to be connected to a digital network. The network enabled digital video camera includes a digital network module arranged to transmit and receive digital signals, an input/output port being an electrical connector and being connected to the digital network module, and an analog video generator arranged to output an analog video signal. The input/output port connected to the digital network module is also connected to the analog video generator. The present invention also relates to an adaptor used to connect the network enabled digital video camera to an off-the-shelf video preview device.

11 Claims, 11 Drawing Sheets

U.S. PATENT DOCUMENTS

2009/0185792 A1* 7/2009 Braunstein et al. ........... 386/117
2009/0231474 A1* 9/2009 Ludwig ......................... 348/252

FOREIGN PATENT DOCUMENTS

| JP | 2006293440 A | 10/2006 |
|---|---|---|
| TW | 0236844 | 7/2005 |
| WO | 2006/046805 | 5/2006 |
| WO | 2006/055948 | 5/2006 |
| WO | 2007/028698 | 3/2007 |
| WO | 2007/036308 | 4/2007 |

OTHER PUBLICATIONS

Saad et al., "An IEEE 1394—Firewire—Based Embedded Video System for Surveillance Applications", Proceedings of the IEEE Conference on Advanced Video and Signal Based Surveillance (AVSS'03), (2003).

Yu et al., "Design for Network Camera Based on DSP", 2006 International Conference on Hybrid Information Technology (ICHIT'06), (2006).

* cited by examiner

VIDEO OVER ETHERNET

CROSS REFERENCE TO RELATED APPLICATIONS

This application claims the benefit of U.S. provisional application No. 61/081,854 filed on Jul. 18, 2008 and EPC application No. 08160224.5 filed on Jul. 11, 2008, which are incorporated by reference as if fully set forth.

FIELD OF INVENTION

The present invention relates to a network enabled digital video camera arranged to be connected to a digital network. The network is enabled digital video camera includes a digital network module is arranged to transmit and receive digital signals, an input/output port being an electrical connector and being connected to the digital network module, and an analog video generator arranged to output an analog video signal. The present invention also relates to an adaptor used to connect the network enabled digital video camera to an off-the-shelf video preview device.

BACKGROUND

Network enabled digital video cameras are today used in various applications. They may for instance be used in applications such as security surveillance and remote monitoring.

In order to allow preview of the view from a network enabled digital video camera, it is generally provided with an analog output for connecting a display for preview. This enables a simple and robust way of viewing the video from the camera on site during installation for checking camera settings, e.g., field of view and focus. The analog connector enables the analog video signal to be transmitted into a video preview device via a coaxial cable, for example, without the need of any additional devices. Though, one drawback with using the analog connector together with a coaxial cable, for example, is that it may be difficult to remove the coaxial cable from the analog connector without adjusting the position of the camera.

However, for a modern digital network camera with internal image compression, image processing and Ethernet compatibility there is no direct need to have an analog video output connector, except for enabling preview of the captured video at the camera site and using an analog display. In fact cameras of today are becoming smaller and smaller and thereby limiting the number of ports that the camera may carry. Thus, additional connectors result in bulky designs and non-discrete installations. Another problem is that with increasing number of connectors the camera become more vulnerable to water, it is hard to make the connectors water resistant. However, by removing the analog output the possibility of previewing the view of the networked digital video camera in a simple way is also removed.

The preview of the view from a network enabled digital video camera can be provided by means of a video preview device, communicating with the camera over the network. The video preview device can then be positioned close to the installation site of the camera and modifications on the installation can be monitored. The communication over the network is normally performed using a communication protocol, e.g., the TCP/IP communication protocol. However, although the TCP/IP communication protocol have a lot of advantages, it adds in complexity and additional devices. Thus, data receivers, decoders and a network socket close to the camera installation site would be needed in order to view the video from the camera on the video preview device during installation.

Thus, a problem with today's network cameras, without analog output connector, is the lack of simple tools for adjustments during installation of the camera (e.g., field of view and focus).

SUMMARY OF THE INVENTION

One object of the present invention is to facilitate preview, at the site of the camera, of a view captured by the camera and still enable the use of small camera bodies.

In particular, according to one aspect of the invention, a network enabled digital video camera arranged to be connected to a digital network comprises a digital network module arranged to transmit and receive digital signals, an input/output port being an electrical connector and being connected to the digital network module, and an analog video generator arranged to output an analog video signal. The network enabled digital video camera is characterized by said input/output port that is connected to the digital network module also being connected to the analog video generator.

In one embodiment, the video generator can be arranged to generate a basic analog video signal which is not additionally modulated by a carrying wave, and send this basic analog video signal not being additionally modulated by a carrying wave via the input/output port. A basic analog video signal may be any analog video signal not being additionally modulated by a carrying wave having VHF or UHF frequencies. For instance, Component video, Composite video, S-VIDEO, YPbPr etc. PAL, SECAM and NTSC signals are examples of such a basic analog video signal with no carrying wave having VHF or UHF frequencies added to the signal. By sending the analog video signal without modulating the signal by a carrying wave for transmission at a carrying frequency, a video preview device is able to receive the signal and display the video on its display without the need of a tuner.

In another embodiment, the input/output port can also be connected to an electrical power receiving unit being arranged to receive power via the input/output port. The electrical power receiving unit is arranged to power the network enabled digital video camera. Thus, only an Input/Output (I/O) port is needed in order to power the network enabled digital video camera, preview the video sent from the network enabled digital video camera, and receive and send digital data (i.e. digital video) from and to the network enabled digital video camera.

In yet another embodiment, an input and/or output line from the digital network module can be connected to an output line from the analog video generator, thereby an analog video signal and a digital signal are transmitted on the same signal wire.

In another embodiment, the network enabled digital video camera can further comprise an enable/disable unit, said enable/disable unit is arranged to enable/disable the sending of the signal from the analog video generator. By only enabling transmission of the video signal during installation of the network enabled digital video camera, the risk for signal interference may be avoided. The enable/disable unit can automatically disable the analog video generator when digital signals is transmitted through the input/output port. Further, the enable/disable unit can automatically enable the analog video generator when no digital signals is transmitted through the input/output port.

According to another embodiment, it might be useful to have both analog video signal and digital data signal coexisting in the network, then the enable/disable unit can be arranged to be enabled/disabled in response to signals received via the digital network. This enables the possibility to transmit both analog video and digital network signals at the same time.

According to another embodiment, the input/output port can be a network port. The network port being adapted to carry any one of 10/100/1000 Mbps data traffic. Some examples of network ports are an Ethernet port, a modular port being arranged to receive a modular connector, e.g., a RJ45 connector or a M12 connector.

According to yet another embodiment, the digital network module can be arranged to transmit and receive basic digital signals which is not additionally modulated by a carrying wave, and transmit and receive this basic digital signal not being additionally modulated by a carrying wave via the input/output port. Basic digital signals may be any Ethernet compatible digital signals. By transmitting digital signals without modulating the signals by a carrying wave for transmission at a carrying frequency or receiving unmodulated digital signals no extra electronic devices or demodulators are needed to convert the digital signals to the Ethernet standard.

According to another aspect of the invention, an adaptor comprises a first input/output port being arranged to carry digital network traffic, a second input/output port being arranged to carry digital network traffic and being connected to the first input/output port, and a third output port being connected to the first input/output port, and being arranged to carry analog video signals.

Such an adaptor can be used to connect the input/output port of the network enabled digital video camera to an off-the-shelf analog video preview device. The input/output port of the network enabled digital video camera is normally a network port adapted to 10/100/1000 Mbps data traffic, such as an Ethernet port, a modular port being arranged to receive a modular connector, e.g., a RJ45 connector or a M12 connector, whereas the off-the-shelf analog video preview device normally is equipped with an analog video port, such as an BNC, RCA or mini-DIN connector. Thus, an adapter arranged to connect the off-the-shelf video preview device to the I/O port is needed. The first and second input/output ports of the adaptor can be RJ45 connectors or M12 connectors. The third output port of the adaptor can then be an analog video output port, such as a BNC, RCA or mini-DIN connector. The first and second input/output ports are arranged to pass through digital network traffic and/or electrical power provided in accordance with the PoE IEEE 802.3 standard. In addition, the first input/output port of the adaptor is arranged to pass through analog video signals. The third output port is arranged to pass through analog video signals.

According to one embodiment of the invention, the adaptor can further comprise a separation unit, the first input/output port being connected to the third output port via the separation unit, the separation unit being arranged separate the digital network traffic from the analog video signal. Thus, avoiding problems arising from different electric potentials between the different equipment connected to the digital network. Hence, any digital network traffic passing through the first input/output port does not arrive to the video preview device. If digital network traffic would arrive to the video preview device, it could interfere with the analog video signal and thus the view on the video preview device would be corrupted. The separation unit can be arranged to electrically isolate the analog video connector from the digital network. The separation unit can, for example, be based on a transformer or a capacitor.

According to another embodiment, the third output port can be an analog video output port. The network port being adapted to carry any type of analog video signals, such as PAL, NTSC, SECAM, Component video, Composite video, S-VIDEO, or YPbPr. Some examples of standard analog video ports are a BNC, RCA or mini-DIN connector.

According to yet another embodiment of the invention, the adapter can further comprise a battery being connected to the first input/output port and being arranged to deliver power through said first input/output port. An adaptor of this type comprising the battery can be used to power the network enabled digital video camera during installation. If an adaptor with a battery is used no external Power over Ethernet supply is needed during the installation.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in more detail by way of examples with reference to the appended schematic drawings, which shows presently preferred embodiments of the invention.

DETAILED DESCRIPTION

Figure 1:
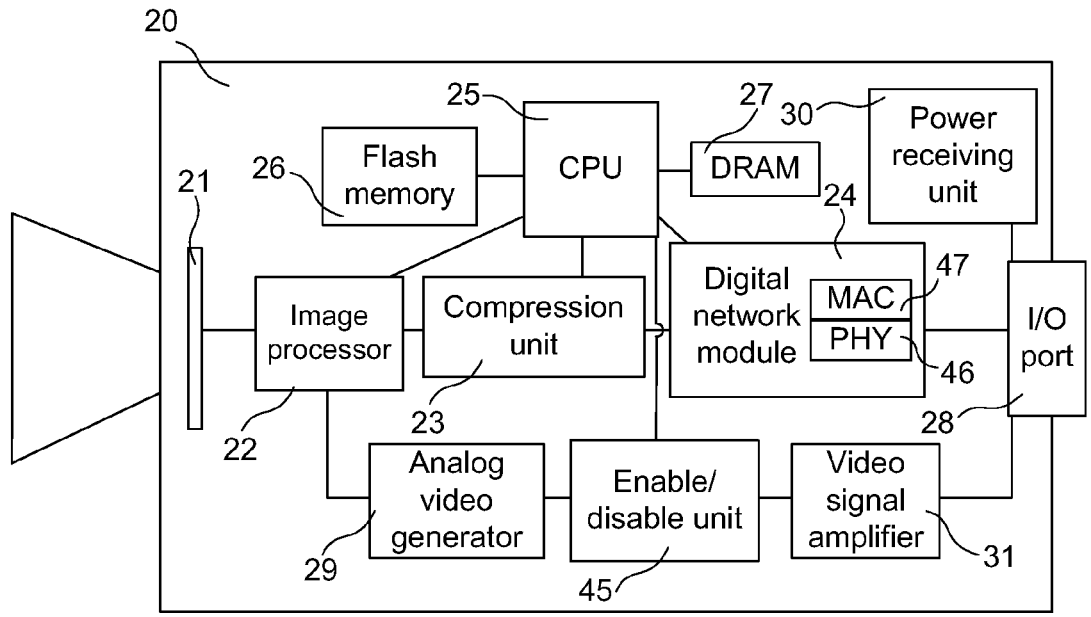
FIG. 1 shows an embodiment of a network enabled digital video camera according to the present invention.

The same reference numerals are used to refer to similar devices/functions, in the description below.

FIG. 1 illustrates a network enabled digital video camera 20 according to an embodiment of the present invention. The network enabled digital video camera is arranged to be connected to a digital network. The network enabled digital video camera 20 comprises an image sensor 21, an image processor 22, a compression unit 23, a digital network module 24, a CPU 25, a flash memory 26 a DRAM 27, an input/output port (I/O port) 28, an analog video generator 29 and a power receiving unit 30.

The I/O port 28 is a single electrical connector. More specifically, a network port adapted to 10/100/1000 Mbps data traffic, such as an Ethernet port, a modular port being arranged to receive a modular connector, e.g., a RJ45 connector. Normally the I/O port 28 is arranged to receive a network cable, such as a twisted pair cable (e.g., of Cat 5, Cat 5e or Cat 6).

The network enabled digital video camera 20 can also comprise a video signal amplifier 31. If so, the analog video generator 29 is connected to the I/O port 28 via the video signal amplifier 31. When passing through transformers, resistors, capacitors or the like the analog video signal is attenuated. In order to compensate for this loss the analog video signal is amplified by the video signal amplifier 31. The gain in the video signal amplifier 31 is set to compensate insertion losses passing the analog video signal through the transformers, resistors, capacitors or the like.

Further, the network enabled digital video camera 20 can comprise an enable/disable unit 45. If so, the analog video generator 29 is connected to the I/O port 28 via the enable/disable unit 45. The enable disable/unit can also be connected to CPU 25. The enable/disable unit 45 is arranged to enable/disable the analog video generator 29, see below.

Generation of digital video images in the network enabled digital video camera 20 and provided to the I/O port 28 can be described as below. The image sensor 21, e.g., a CCD or a CMOS, captures digital images. The captured digital images are forwarded to the image processor 22, wherein the digital video images are rendered. The rendered digital video images are forwarded to the compression unit 23, wherein the digital video images are compressed according to a predefined standard, such as JPEG, M-JPEG or MPEG. Thereafter the compressed digital video signal is forwarded to the digital network module 24 arranged to transmit and receive digital signals, wherein the digital video signal is processed and prepared for transmission through a digital network via the I/O port 28. The CPU 25 controls the camera functions. The CPU 25 is able to store digital data in the flash memory 26 and in the DRAM 27.

The digital network module 24 is arranged to transmit and receive basic digital signals which is not additionally modulated by a carrying wave, and transmit and receive this basic digital signal not being additionally modulated by a carrying wave via the input/output port 28. By transmitting digital signals without modulating the signals by a carrying wave for transmission at a carrying frequency or receiving unmodulated digital signals no extra electronic devices or demodulators are needed to convert the digital signals to the Ethernet standard.

Additionally, an analog video signal can be generated in the network enabled digital video camera 20. The analog video signal is generated via the analog video generator 29. The analog video generator 29 is connected to the image processor 22. Thus, the analog video generator 29 is provided with processed image information from the image processor 22 and converts the image information into a basic analog video signal. A basic analog video signal may be any analog video signal not being additionally modulated by a carrying wave having VHF or UHF frequencies, e.g., Component video, Composite video, S-VIDEO, YPbPr etc. PAL, SECAM and NTSC signals are examples of such a basic analog video signal with no carrying wave having VHF or UHF frequencies added to the signal. The analog video generator 29 is also connected to the I/O port 28, optionally via the video signal amplifier 31. Thus, the analog video generator 29 is arranged to send the basic analog video signal via the I/O port 28. By sending the analog video signal without modulating the signal by a carrying wave for transmission at a carrying frequency a video preview device is able to receive the signal and display the video on its display without the need of a tuner.

The network enabled digital video camera 20 is powered by the power receiving unit 30. The power receiving unit 30 is also connected to the I/O port 28. Thus, the power receiving unit 30 is arranged to receive electrical power via the I/O port 28 and to power the network enabled digital video camera 20. The electrical power is normally provided in accordance with the Power over Ethernet (PoE) standard the IEEE 802.3.

Thus, the digital network communication, e.g., communication using Ethernet, the analog video signal and the power, which is powering the network enabled digital video camera 20, passes through the same I/O port 28. As mentioned above the I/O port 28 is normally arranged to receive a connector attached to a network cable, such as a twisted pair cable (e.g., of cat 5, cat 5e, or cat 6). A twisted pair network cable normally have eight lines divided into four pairs of lines.

In one embodiment, an output from the analog video generator 29 is connected to an input and/or output from the digital network module 24, thereby an analog video signal and a digital signal are transmitted on the same signal wire.

In a twisted pair network cable, the digital signals are defined by the electric potential difference between a pair of lines of the network cable. By arranging the analog video signal as a signal defined by the electric potential difference between two pairs of lines of the network cable the analog video signal and the digital signals can be sent through the same signal wires without affecting the digital signal and vice versa. This implies great advantages in that the analog video signal does not interfere with the network traffic and that there is no need for shifting the signal in frequency in order to separate the analog video signal from the network traffic.

Just as for network enabled digital video cameras with a separate analog video output, the analog video signal may be used to preview the view from the network enabled digital video camera 20. This enables simple and robust way of viewing the video from the camera on the camera site during installation for checking the camera 20 settings, e.g., field of view and focus.

Figure 2:
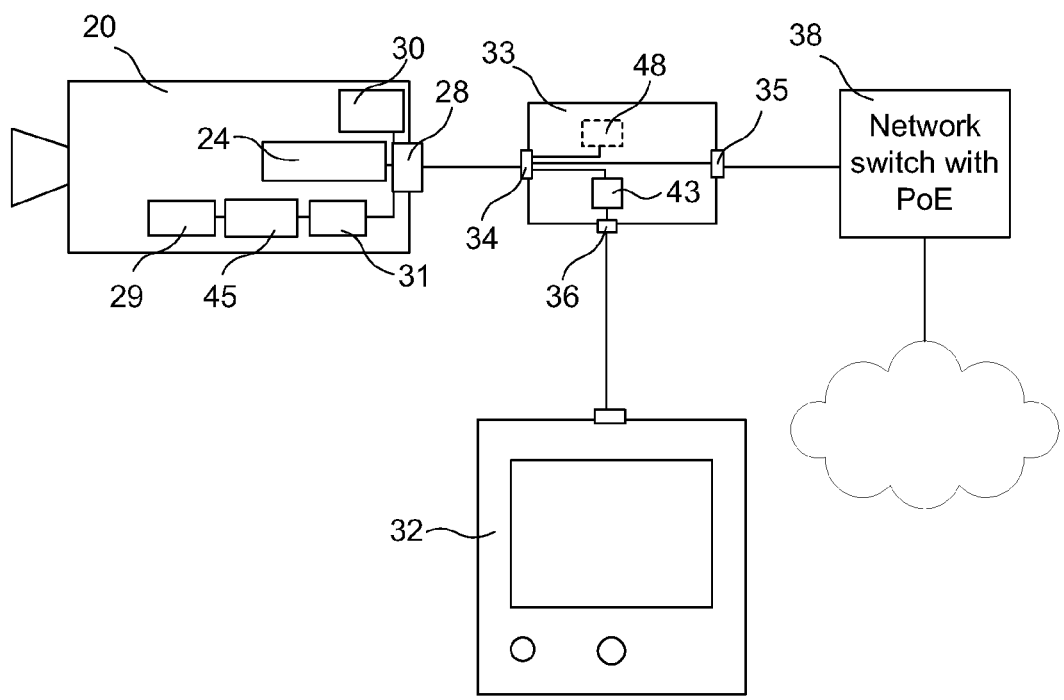
FIG. 2 illustrates a video preview device connected to the network enabled digital video camera of FIG. 1 via an adapter.

FIG. 2, to which reference now is made, illustrates a video preview device 32 (e.g., a handheld field video monitor) connected to the network enabled digital video camera 20. Thus, the preview of the view from the network enabled digital video camera 20 is provided by means of a video preview device 32, connected to said I/O port 28. When installing a network enabled digital video camera 20, the video preview device is positioned close to the installation site of the camera 20 and modifications of the camera during the installation can be monitored.

The video preview device 32 is adapted to receive analog video signals of a preferred type. Some such types are: PAL, NTSC, SECAM, Component video, S-VIDEO, or YPbPr.

Although the I/O port 28 is provided with an analog video signal, off-the-shelf analog video preview devices 32 are not adapted to be connected to an I/O port 28 being a network port adapted to 10/100/1000 Mbps data traffic, such as an Ethernet port, a modular port being arranged to receive a modular connector, e.g., a RJ45 connector. Thus, an adapter 33 arranged to connect the off-the-shelf video preview device 32 to the I/O port 28 is needed. The adapter 33 comprises a first input/output port 34, a second input/output port 35, being connected to the first input/output port 34 and a third output 36 port being connected to the first input/output port 34. The first and second input/output ports 34, 35 are arranged to pass through digital network traffic. The first input/output 34 and the third output port 36 are arranged to pass through analog video signals.

The first and second input/output ports 34, 35 are network ports adapted to 10/100/1000 Mbps data traffic, such as Ethernet ports, modular ports being arranged to receive modular connectors, e.g., RJ45 connectors. The third output port 36 is an analog video output port, such as a BNC, RCA or mini-DIN connector.

The adapter 33 can also comprise a separation unit 43 arranged to separate the analog video signal from the digital network traffic. The first input/output port 34 is connected to the third output port 36 via the separation unit 43. By using the separation unit 43, the digital network traffic passing through the first input/output port 34 is not passed through to the third output port 36, the analog video output port. Hence, any digital network traffic passing through the first input/output port 34 does not arrive to the video preview device 32. If digital network traffic would arrive at the video preview device 32, it could interfere with the analog video signal and thus the view on the video preview device 32 would be corrupted. The separation unit 43 is arranged to separate the analog video signal from the digital network traffic and can, for example, be based on a transformer 37 or a capacitor 41. The separation unit 43 can also be arranged to electrically isolate the analog video connector from the digital network.

The separation unit 43 can also be arranged in such a way that the analog video signal passing through the first input/output port 34 is not passed through to the second input/output port 35. This implies that the analog video signal could not be captured anywhere else on the network. Additionally, it also implies that the analog video signal will not interfere with any other device on the network connected downstream from the adapter 33.

As mentioned above, the network enabled digital video camera 20 is powered via the power receiving unit 30. When the power receiving unit 30 is connected to the I/O port 28, the electrical power powering the network enabled digital video camera 20 is provided through said I/O port 29. The electrical power is normally provided using PoE (IEEE 802.3 standard). Thus, the first and second input/output ports 34, 35 of the adapter 33 is also arranged to make electrical power provided in accordance with the IEEE 802.3 standard to pass through. The source of the PoE can, for example, be a network switch 38 with built-in PoE-supply. Optionally, the source of the PoE can be a battery 48 built in into the adapter 33. If so, the battery 48 is connected to the first input/output port 34 and the battery 48 is arranged to deliver power though said first input/output port 34 in order to power the network enabled digital video camera 20.

The first input/output port 34 is arranged to pass through both input and output digital network traffic. The first input/output port 34 is also arranged to pass through input analog video signals. Further, the first input/output port 34 is also arranged to pass through output PoE.

The second input/output port 35 is arranged to pass through both input and output digital network traffic. The second input/output port 35 is also arranged to pass through input PoE.

The third output port 36 is arranged to pass through output analog video signals.

Further, the digital network module 24 comprises a network MAC (Media Access Control) 46, a network PHY (physical layer) 47 for implementing digital network communication, see FIG. 1. When sending data from the network enabled digital video camera 20 the network MAC 46 converts packetized data into Ethernet packets which are sent to the network PHY 47. The network PHY will then transmit the packets on the output lines of the I/O port 28. Arriving packets are processed in the opposite direction. Packets are received by the network PHY 47 from input lines of the I/O port 28, and then forwarded to the network MAC 46 which performs check summing and extracts the packetized data.

In addition to sending and receiving digital data, the network PHY 47 is responsible for managing different network links used to send and receive data on. When a compatible device is detected in the other end on the network cable, a short handshake protocol is used in order to secure a link and for example decide which transmission speed to use. When everything is in place a message called "link detect" is sent to the CPU 25. If the compatible device is disconnected, it is detected by the network PHY 47 and a message called "link disconnected" is sent to the CPU 25.

To reduce the risk for signal interference, between the digital network traffic and the analog video signal, the video signal may be restricted to transmission during installation and can be disabled after checking the camera settings, e.g., field of view and focus. Thus, as mentioned above, the network enabled digital video camera 20 can also comprise said enable/disable unit 45. The enable/disable unit 45 is arranged to enable/disable the sending of the signal from the analog video generator. When the CPU 25 receives the "link detect" message, the analog video generator 29 is disabled via the enable/disable unit 45. Accordingly, when the CPU receives the "link disconnect" message, the analog video generator 29 is enabled via the enable/disable unit 45.

Thus, the enable/disable unit 45 can automatically disable the analog video generator 29 when digital signals is transmitted through the input/output port 28 and the enable/disable unit 45 can automatically enable the analog video generator 29 when no digital signals is transmitted through the input/output port 28. Hence, it is made possible to automatically disable the analog video signal when a link is detected and to enable video output when no link is detected. In some cases, it is useful to have both analog video signal and digital data signal coexisting in the network, then the enable/disable unit 45 and thus the analog video generator 29 can be arranged to be enabled/disabled in response to signals received via the digital network. This enables the possibility to transmit both analog video and digital network signals at the same time.

Below are presented five different embodiments of the connection of the digital network module 24, the analog video generator 29, and the power receiving unit 30 to the I/O port 28. These five embodiments are to be seen as examples of specific implementations of the invention; there are numerous modifications of the embodiments which are still within the scope of the invention as defined by the appended claims. For example, the analog video signal may be divided into more than one component and as such sent as different signals. The different signals may be sent over different pair of lines. This can be implemented, for example, for the S-Video or the component video.

Figure 3:
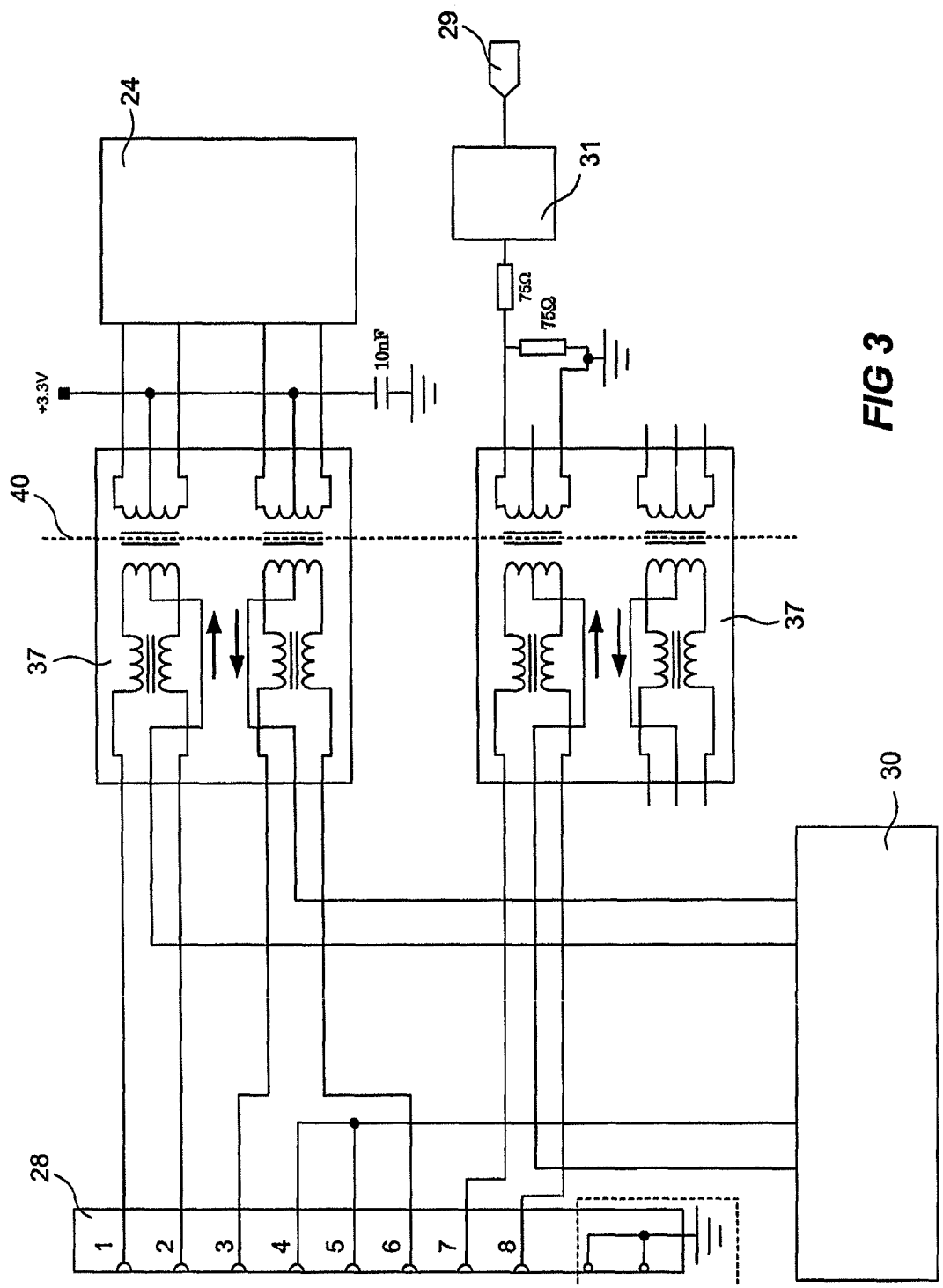
FIG. 3 shows a first embodiment of the connection of a digital network module, a analog video generator, and a power receiving unit to an I/O port of the network enabled digital video camera of FIG. 1.

A first embodiment is shown in FIG. 3. This embodiment is advantageously used for an Ethernet system adapted to 100 Mbps data traffic (100Base-T standard where only two out of four pairs of the connector and cable are used when transmitting data traffic over the digital network). In this embodiment, power is provided to the network enabled digital video camera 20 via PoE. The digital signals are defined by the electric potential difference between two lines within a pair of lines. In the 100Base-T standard outgoing signals are passed through lines 1 and 2 in the I/O port 28, and incoming signals are passed through lines 3 and 6 in the I/O port 28. An Ethernet isolation transformer 37 transfer received/transmitted data signals over an isolation border 40. For example, a 10/100 BASE-TX transformer can be used. The isolation border 40 is 1500 Vrms isolation (e.g., minimum a 2.5 mm gap in air). The PoE electrical power is provided as an electric potential difference between lines from two separate pairs. According to the IEEE 802.3 PoE standard, there are two different options, either the electric potential difference is provided between lines from pairs 1 and 2 and pairs 3 and 6 or the electric potential difference is provided between lines from pairs 4 and 5 and pairs 7 and 8. The embodiment shown in FIG. 3 is adapted to work with either of these PoE options. In this embodiment, the analog video signal is defined by the electric potential difference between the two lines of a pair, between lines 7 and 8 in the I/O port 28. The analog video signal is transferred over the isolation border 40 via another Ethernet isolation transformer 37. Also, this transformer 37 can be a 10/100 BASE-TX transformer. When passing through transformers, resistors, capacitors or the like the analog video signal is attenuated. In order to compensate for this loss the analog video signal is amplified by the video signal amplifier 31. The gain in the video signal amplifier 31 is set to compensate insertion losses passing the analog video signal through the transformers, resistors, capacitors or the like.

Figure 4A:
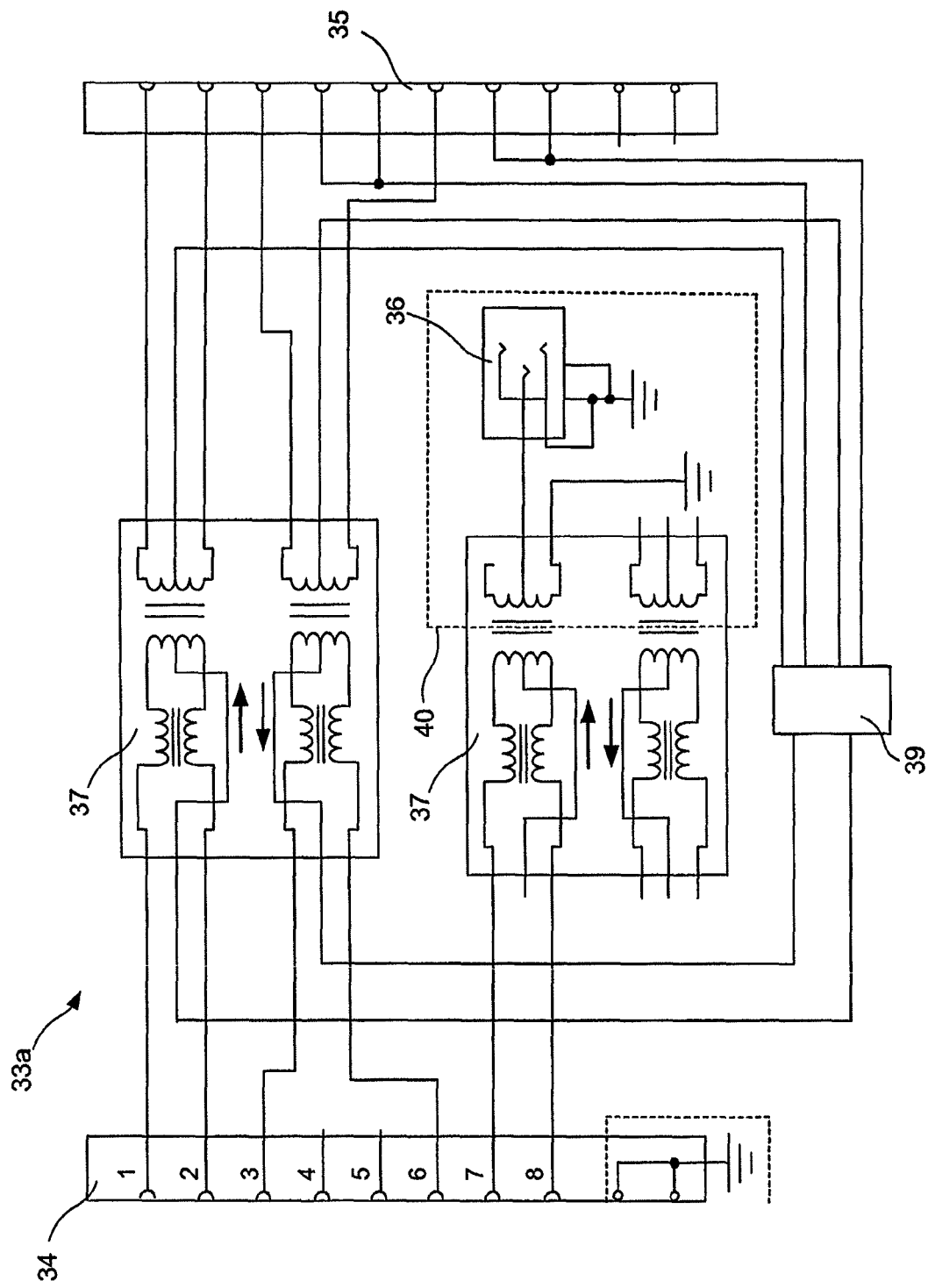
FIG. 4a shows a first embodiment of an adaptor used to connect a network enabled video camera implementing the embodiment according to FIG. 3 to a video preview device.
Figure 4B:
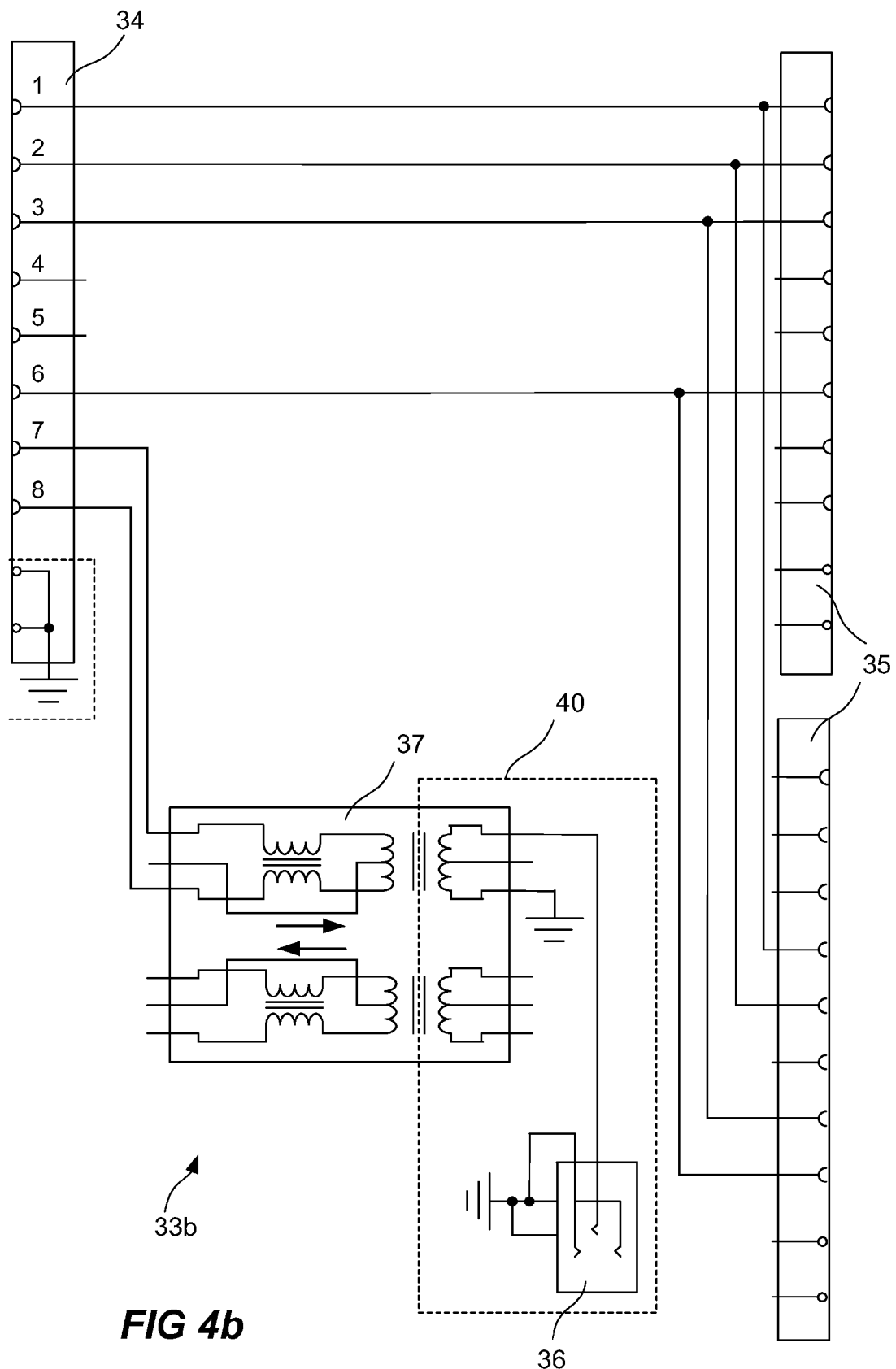
FIG. 4b shows a second embodiment of an adaptor used to connect a network enabled video camera implementing the embodiment according to FIG. 3 to a video preview device.

As mentioned above, in connection with FIG. 2, an adapter 33 may be used to connect the off-the-shelf video preview device 32 to the I/O port 28. In FIGS. 4a and 4b two possible embodiments of such an adapter 33 connecting the off-the-shelf video preview device 32 to the I/O port 28 of the embodiment shown in FIG. 3 are shown as an adapter 33a and 33b, respectively.

In the adapters 33a, 33b, the second input/output port 35 is arranged to pass through input PoE. The second input/output port 35 is arranged to pass through input from either of the two possible PoE standards mentioned above (electric potential difference is provided between lines of pairs 1 and 2 and lines of pairs 3 and 6 or the electric potential difference is provided between lines of pairs 4 and 5 and lines of pairs 7 and 8).

A common feature of the two adapters 33a, 33b shown in FIGS. 4a and 4b is that the adapters 33a, 33b are arranged to only pass through PoE electrical power as an electric potential difference between lines of pair 1, 2 and pair 3, 6. Thus, electrical power is delivered to the I/O port 28 of the network enabled digital video camera 20 as an electric potential difference between lines of pair 1, 2 and pair 3, 6, regardless of whether the second input/output port 35 is arranged to receive PoE electrical power as an electric potential difference between lines of pair 1, 2 and pair 3, 6 or as an electric potential difference between lines of pair 4, 5 and pair 7, 8.

In the embodiment of FIG. 4a, the switching between implementations of the two PoE standards is performed by means of a switch 39 together with a transformer 37 arranged in the adapter 33a. The transformer 37 can be a 10/10 BASE-TX transformer. Thus, when the switch is in a first position the second input/output port 35 is arranged to let through electrical power as a voltage potential difference between lines of pair 1, 2 and pair 3, 6 and when the switch is in a second position the second input/output port 35 is arranged to let through electrical power as a voltage potential difference between lines of pair 4, 5 and pair 7, 8.

In the embodiment of FIG. 4b, the switching between the two PoE standards is done by providing the adapter 33b with an input/output port 35 comprising two RJ45 connectors. Thus, when a network cable providing the adapter 33 with electrical power as an electric potential difference between lines of pair 1, 2 and pair 3, 6 a first of the two RJ45 ports is used and when the network cable provides the adapter 33b with electrical power as an electric potential difference between lines of pair 4, 5 and pair 7, 8 a second of the two RJ45 ports is used.

For either of the two adapters 33a, 33b of FIGS. 4a and 4b, the analog video signal is sent from the I/O port 28 as an electric potential difference between the two lines of pair 7, 8, see the I/O port 28 circuitry of FIG. 3. Thus, the first input/output port 34 of the adapter 33 is arranged to receive the analog video signals as a voltage potential difference between the two lines of pair 7, 8. A transformer 37 is inserted in order to separate the computer network circuitry from the analog video signal circuitry in order to enable transfer of the video signal from the network to the third output port 36 avoiding problems arising from different potentials between the two circuitries. The transformer 37 can be a 10/100 BASE-TX transformer.

Note that only the embodiment of FIG. 4a can be used to transmit analog video, digital network traffic and PoE at the same time in case of using the PoE standard of providing electrical power as a voltage potential difference between pairs 4 and 5 and pairs 7 and 8.

Figure 5:
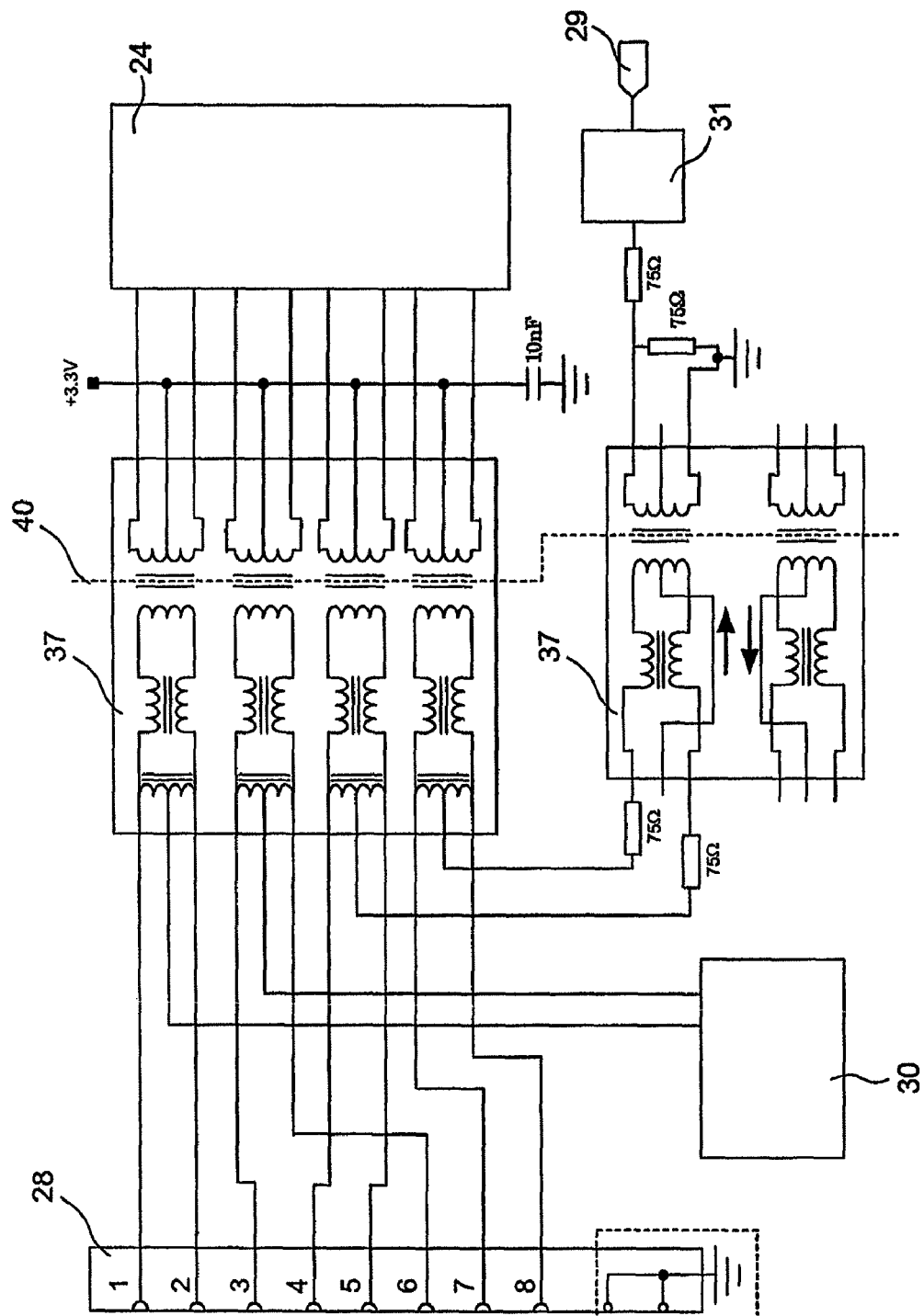
FIG. 5 shows a second embodiment of the connection of the digital network module, the analog video generator, and the power receiving unit to the I/O port of the network enabled digital video camera of FIG. 1.

A second embodiment is shown in FIG. 5. This embodiment is advantageously used for an Ethernet system adapted to 1000 Mbps data traffic (1000 Base-T standard where all of the four pairs are used when transmitting data traffic over the digital network). Also in this embodiment, power is provided to the network enabled digital video camera 20 via PoE. The digital signals are defined by the electric potential difference between lines of the pairs. In the I/O port 28, the pairs are combined as followed: 1 and 2, 3 and 6, 4 and 5, and 7 and 8. In this embodiment, the PoE electrical power is provided as an electric potential difference between the lines of two of the pairs of lines, pair 1, 2 and pair 3, 6. An Ethernet isolation transformer 37 transfer received/transmitted data signals over an isolation border 40. For example, a 1000 BASE-TX transformer can be used. The isolation border 40 is 1500 Vrms isolation (e.g., minimum a 2.5 mm gap in air). In this embodiment the analog video signal is defined by the electric potential difference between pair 4, 5 and pair 7, 8 in the I/O port 28. An Ethernet isolation transformer 37, e.g., a 10/100 BASE-TX transformer, is inserted in order to isolate the video signal generator circuitry from the computer network circuitry in order to enable transfer of the video signal from the video generator to the network while avoiding problems arising from different potentials between the two circuitry. The analog video signal is connected via a resistor to the centre of two of the signal transfer transformers connected to the twisted pair 7, 8 and the return path for the signal is connected via a resistor to the centre of two of the signal transfer transformers connected to the twisted pair 4, 5. When passing through transformers, resistors, capacitors or the like, the analog video signal is attenuated. In order to compensate for this loss, the analog video signal is amplified by the video signal amplifier 31. The gain in the video signal amplifier 31 is set to compensate insertion losses passing the analog video signal through the transformers, resistors, capacitors, or the like.

Figure 6:
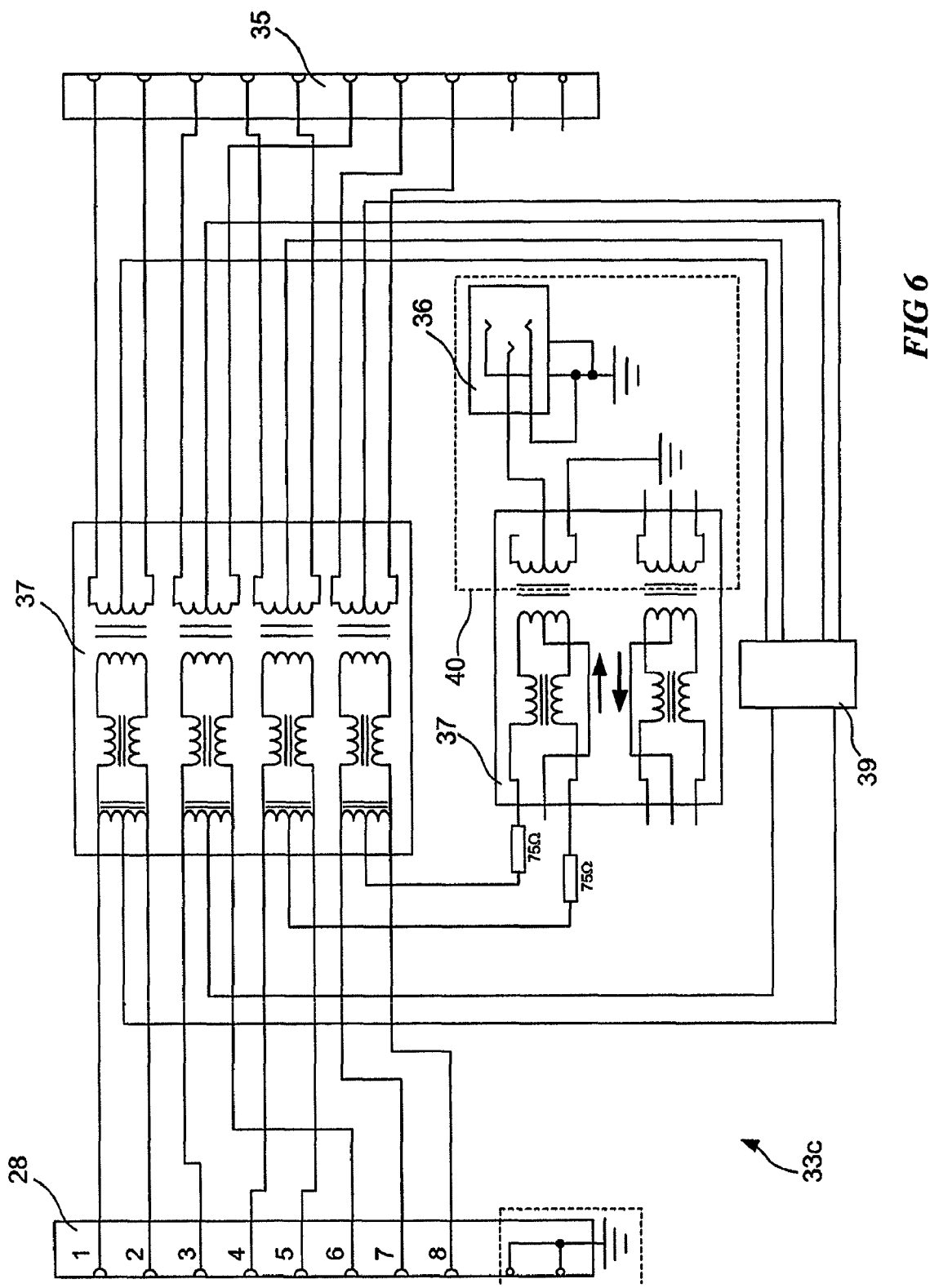
FIG. 6 shows an embodiment of an adaptor used to connect a network enabled video camera implementing the embodiment according to FIG. 5 to a video preview device.

As mentioned above, an adapter 33 is used in order to connect the off-the-shelf video preview device 32 to the I/O port 28. In FIG. 6, an embodiment of such an adapter 33 connecting the off-the-shelf video preview device 32 to the I/O port 28 of the embodiment shown in FIG. 5 is shown as an adapter 33c.

The second input/output port 35 of the adapter 33c is arranged to pass through input PoE. In order to comply with the two different PoE standards, either the electric potential difference is provided between lines of pair 1, 2 and pair 3, 6 or the voltage electric difference is provided between lines of pair 4 and 5 and pair 7 and 8, the second input/output port 35 is arranged to be compatible with either of the two possible PoE standards.

The first input/output port 34 is adapted to pass through PoE with the electrical power as an electric potential difference between the lines of pair 1, 2 and pair 3, 6. Thus, the adapter 33c of FIG. 6 is arranged to only pass through PoE electrical power as an electric potential difference between lines of pair 1, 2 and pair 3, 6 and thus delivering electrical power to the I/O port 28 of the network enabled digital video camera 20 as an electric potential difference between lines of pair 1, 2 and pair 3, 6 regardless of if the second input/output port 35 is arranged to receive PoE electrical power as an electric potential difference between lines of pair 1, 2 and pair 3, 6 or as an electric potential difference between lines of pair 4, 5 and pair 7, 8.

In the adapter 33c of FIG. 6, the switching between the two PoE standards is performed by providing the adapter 33c with a switch 39 together with a transformer 37. For example a 10/100 BASE-TX transformer can be used. Thus, when the switch 39 is in a first position the second input/output port 35 is arranged to pass through electrical power as an electric potential difference between line of pair 1, 2 and pair 3, 6 and when the switch 39 is in a second position the second input/output port 35 is arranged to pass through electrical power as an electric potential difference between line of pair 4, 5 and pair 7, 8.

In the embodiment of FIG. 5, the analog video signal is delivered from the I/O port 28 as an electric potential difference between the lines of pair 4, 5 and pair 7, 8. Thus, the first input/output port 34 of the adapter 33c is arranged to receive the analog video signals as an electric potential difference between pair 4, 5 and pair 7, 8. A transformer 37 is inserted in order to separate the computer network circuitry from the analog video signal circuitry in order to enable transfer of the video signal from the network to the third output port 36 avoiding problems arising from different potentials between the two circuitries. The transformer 37 can be a 10/100 BASE-TX transformer. The analog video signal is connected via a resistor to the centre of two of the signal transfer transformers connected to the line pair 7, 8 and the reference for the analog video signal is connected via a resistor to the centre of two of the signal transfer transformers connected to the line pair 4, 5.

In accordance with the embodiment of FIG. 5, note that if the PoE is provided as a voltage potential difference between the lines of pair 4, 5 and pair 7, 8, the network enabled digital video camera 20 is only provided with electrical power if it is connected to the a PoE delivering unit, e.g., the network switch 38 with built-in PoE-supply, via the adapter 33c shown in FIG. 5.

Figure 7:
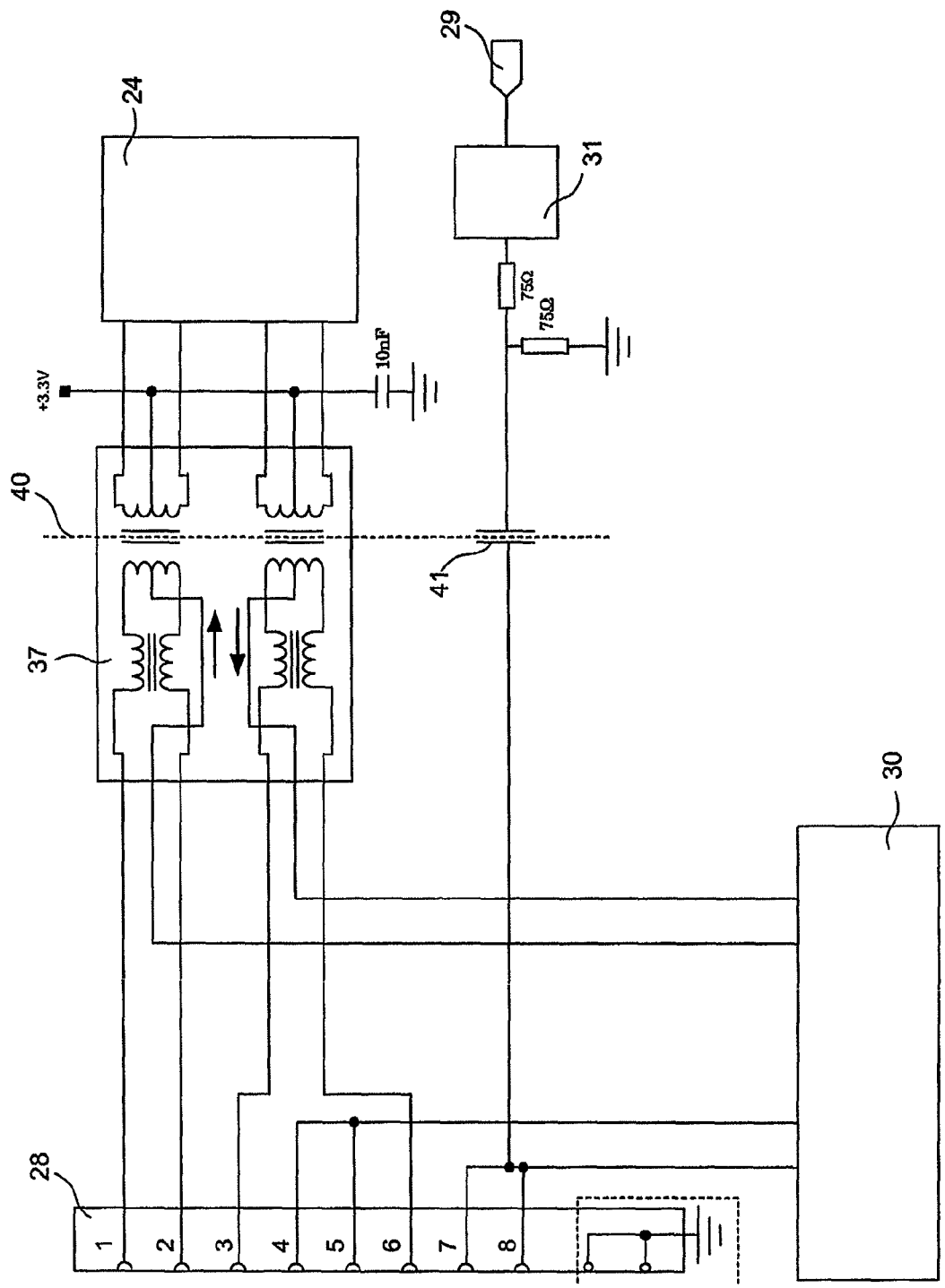
FIG. 7 shows a third embodiment of the connection of the digital network module, the analog video generator, and the power receiving unit to the I/O port of the network enabled digital video camera of FIG. 1.
Figure 8:
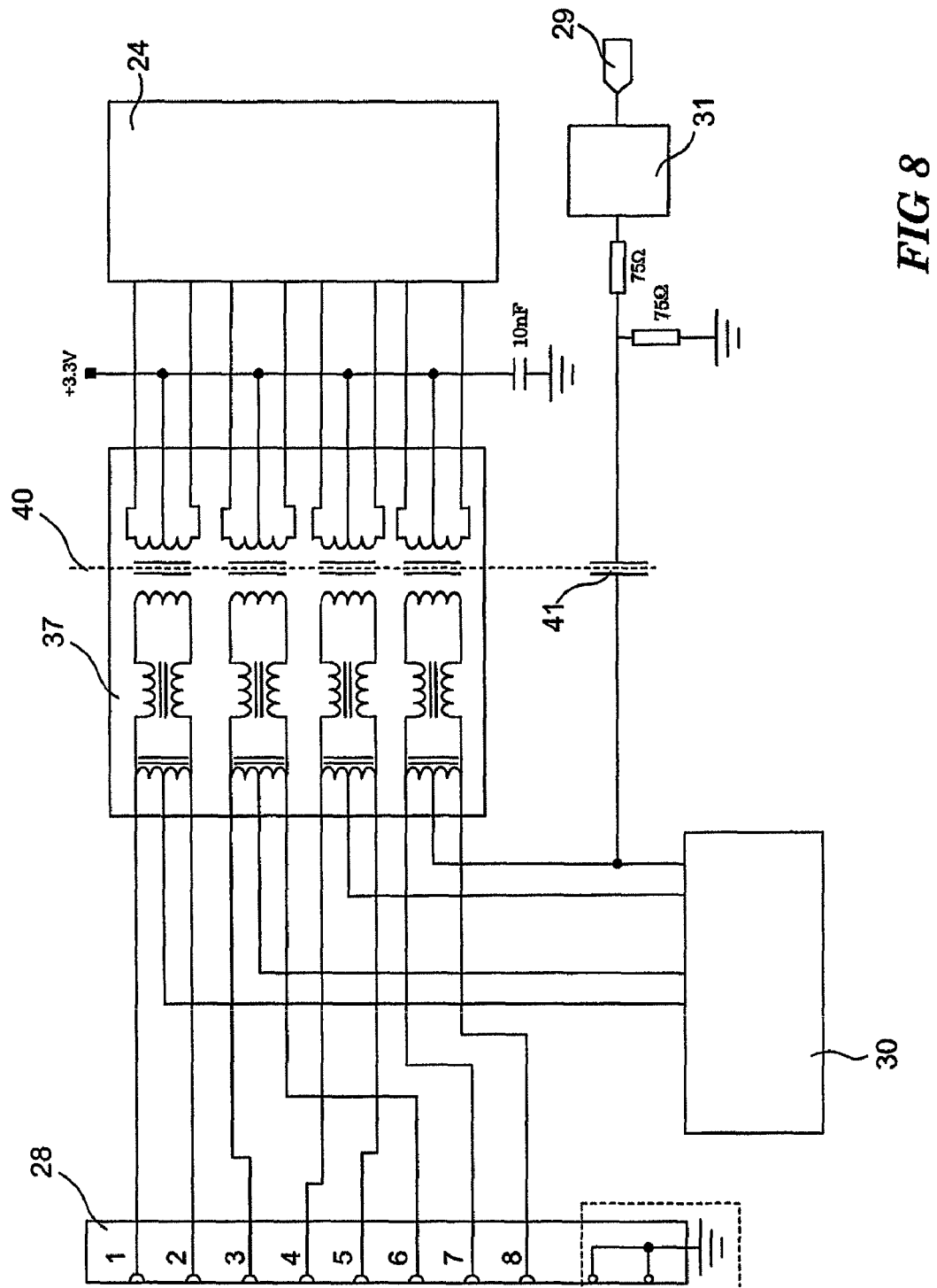
FIG. 8 shows a fourth embodiment of the connection of the digital network module, the analog video generator, and the power receiving unit to the I/O port of the network enabled digital video camera of FIG. 1.

In FIG. 7, a third embodiment of the connection of the digital network module 24, the analog video generator 29, and the power receiving unit 30 to the I/O port 28 is presented, and in FIG. 8 and a fourth embodiment of the connection of the digital network module 24, the analog video generator 29, and the power receiving unit 30 to the I/O port 28 is presented. The third embodiment, FIG. 7, is advantageously used for an Ethernet system adapted to 100 Mbps data traffic (100 Base-T standard where only two out of four pairs are used when transmitting data traffic over the digital network), whereas the fourth embodiment, FIG. 8, is advantageously used for an Ethernet system adapted to 1000 Mbps data traffic (1000 Base-T standard where all of the four pairs are used when transmitting data traffic over the digital network). In both these embodiments power is provided to the network enabled digital video camera 20 via PoE and both embodiments are adapted to work with either of the PoE standards presented above. Thus, the PoE can be provided as either the electric potential difference between the lines of pair 1, 2 and pair 3, 6 or the electric potential difference between the lines of pair 4, 5 and pair 7, 8.

A common feature of these two embodiments is that an isolation capacitor 41 is inserted to separate the video signal generator circuitry from the PoE circuitry in order to enable transfer of video signal from the video generator to the network avoiding problems arising from different potentials between the two circuitries. Preferably, the isolation capacitor 41 have a specification of >2250 VDC.

In both the embodiments of FIGS. 7 and 8, the analog video signal is defined as the electric potential difference between either of line 7 or line 8 and the ground. When passing through resistors, capacitors or the like the analog video signal is attenuated. In order to compensate for this loss the analog video signal is amplified by the video signal amplifier 31. The gain in the video signal amplifier 31 is set to compensate insertion losses passing the analog video signal through the resistors, capacitors or the like.

Figure 9:
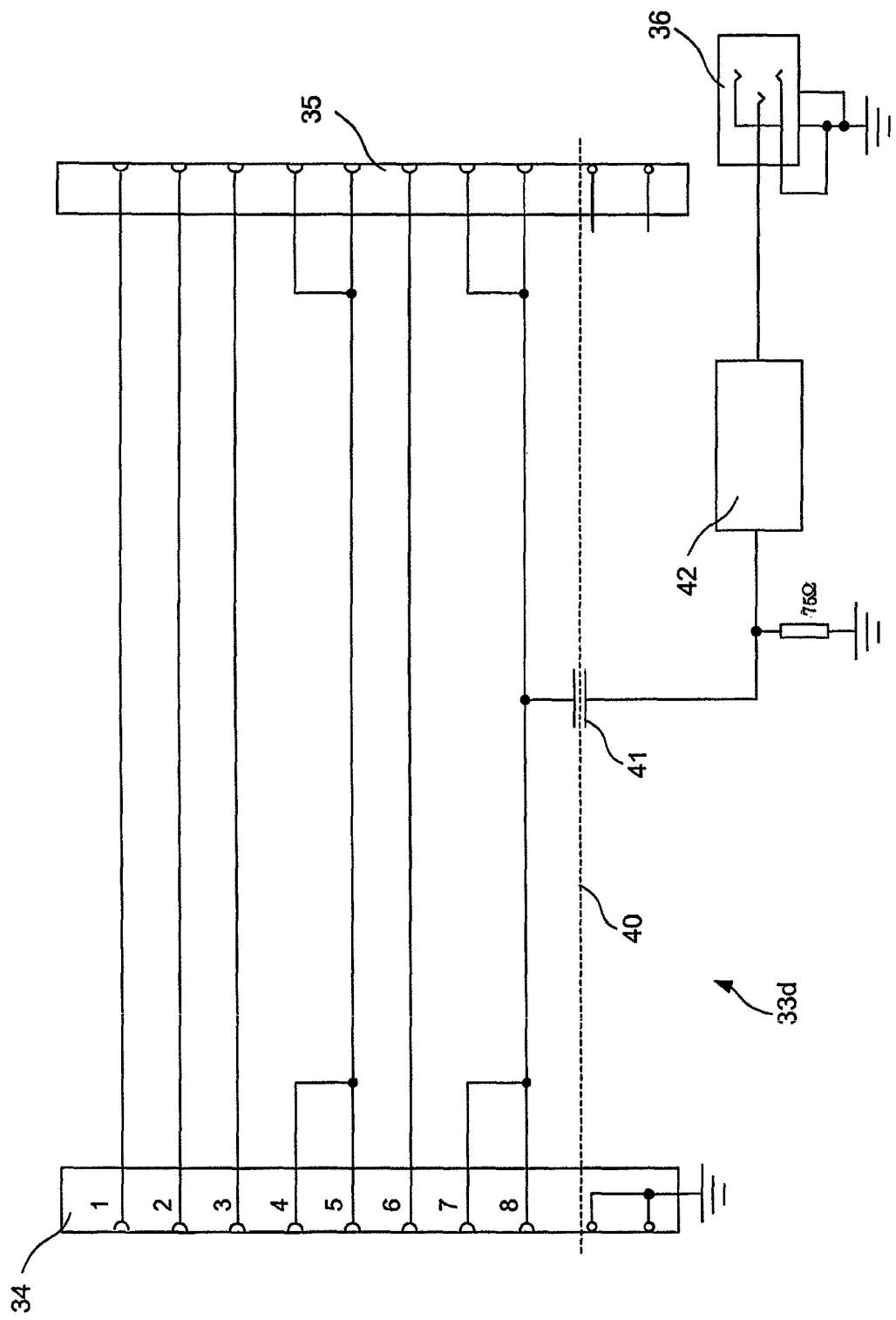
FIG. 9 shows an embodiment of an adaptor used to connect a network enabled video camera implementing the embodiment according to FIG. 7 or 8 to a video preview device.

As mentioned above, an adapter 33 is used in order to connect the off-the-shelf video preview device 32 to the I/O port 28. In FIG. 9, an adapter 33d used to connect the off-the-shelf video preview device 32 to the I/O port 28 of the embodiments shown in FIGS. 7 and 8 is shown.

In the adapter 33d, the analog video signal is separated from the PoE circuitry by means of an isolation capacitor 41. Preferably, the isolation capacitor 41 have a specification of >2250 VDC. Thus, the adapter 33d is arranged to remove DC-components from the PoE. The adapter 33d also comprises an amplifier 42. The amplifier 42 is arranged to amplify the amplitude of the analog video signal due to the attenuation induced by the isolation capacitor 41.

Note that the adapter 33d shown in FIG. 8 only can pass through digital 100 Mbps data traffic (100 Base-T standard where only two out of four pairs are used when transmitting data traffic over the digital network).

Figure 10:
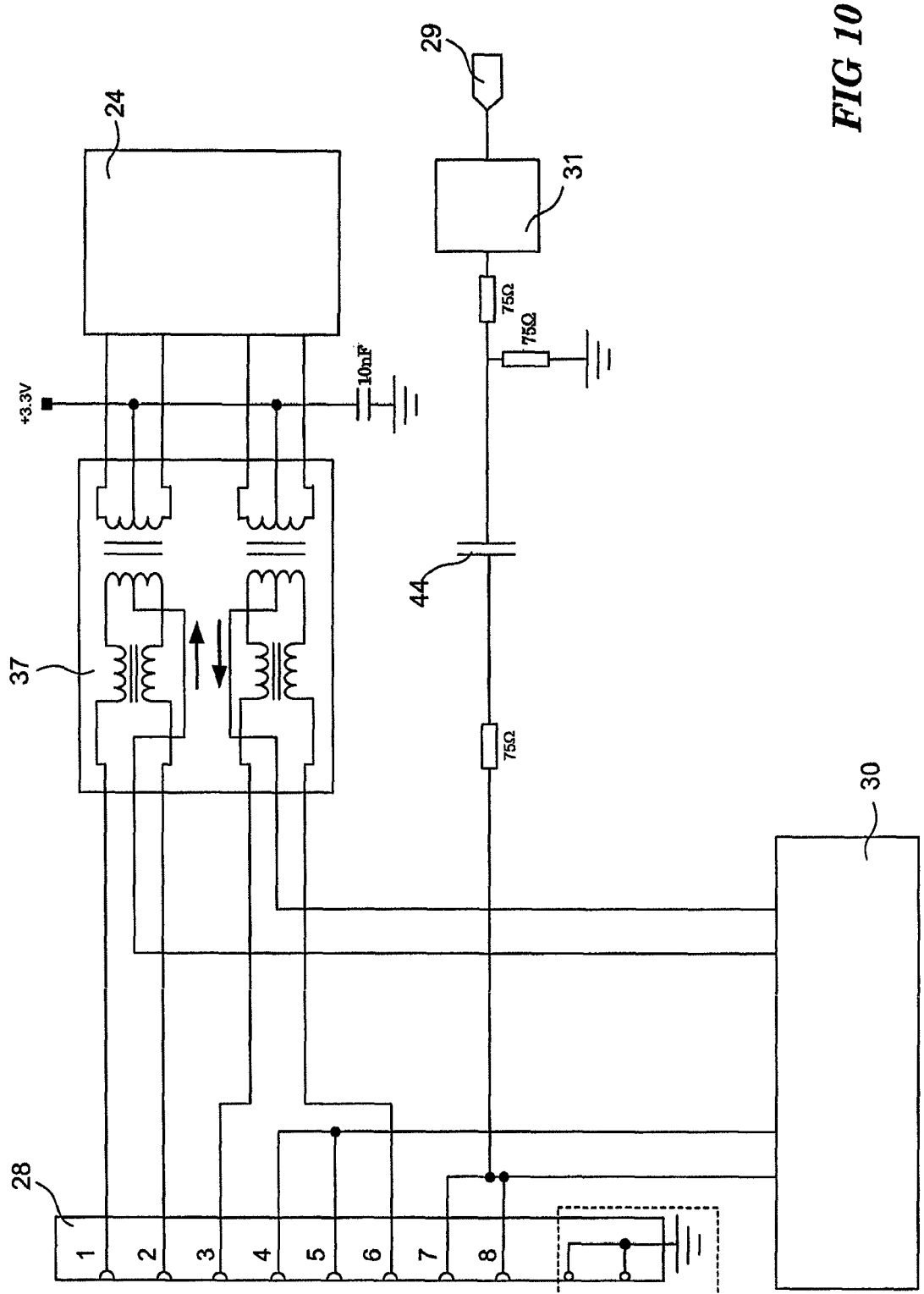
FIG. 10 shows a fifth embodiment of the connection of the digital network module, the analog video generator, and the power receiving unit to the I/O port of the network enabled digital video camera of FIG. 1.

A fifth embodiment is shown in FIG. 10. This embodiment is similar to the embodiment shown in FIG. 7 with the exception that there is no isolation border. Thus, a DC-block capacitor 44 is inserted to separate the video signal generator circuitry from the PoE circuitry in order to enable transfer of video signal from the video generator to the network avoiding problems arising from different potentials between the two circuitry need to have a different specification. Preferably, the DC-block capacitor 44 have a specification of >60 VDC.

Figure 11:
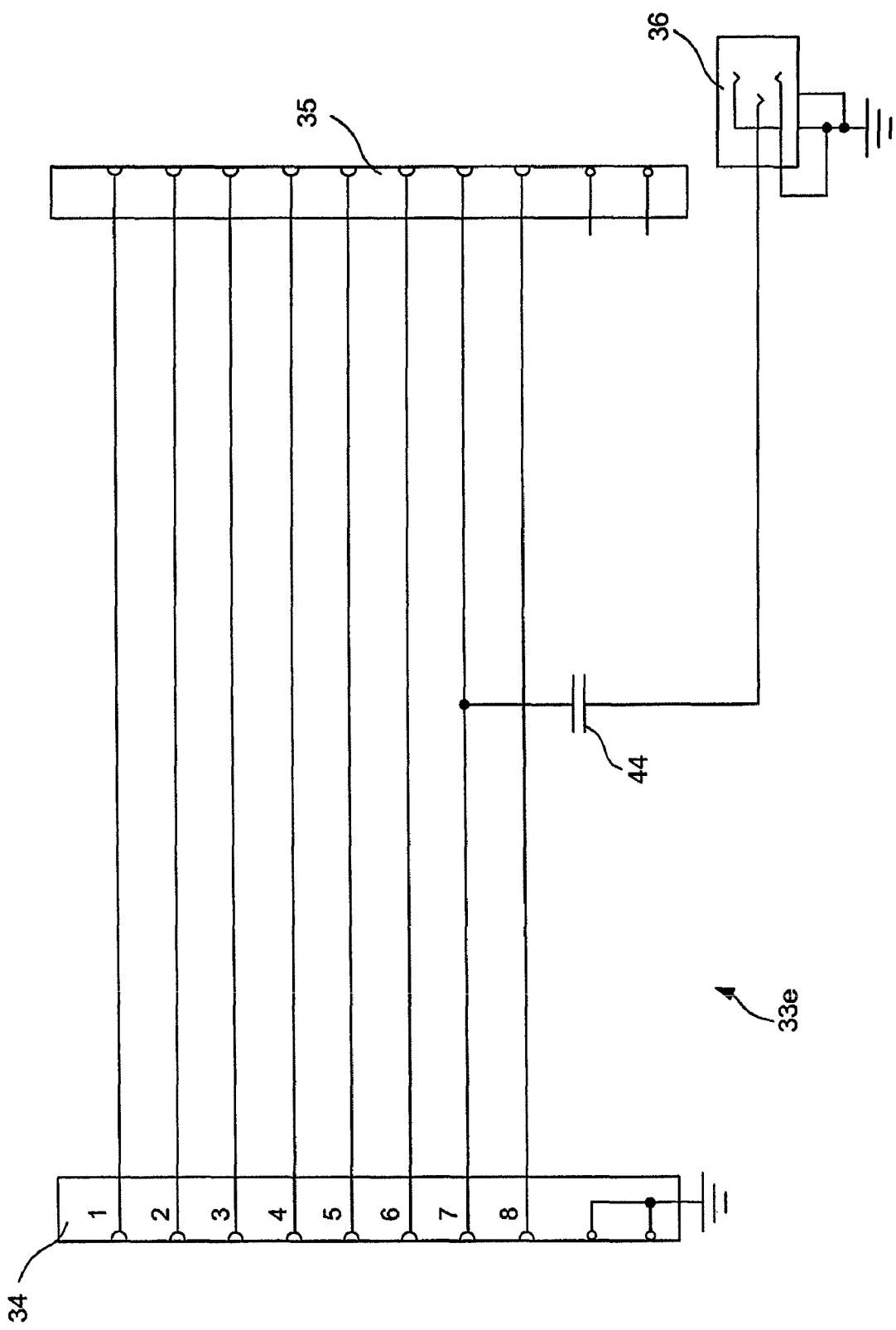
FIG. 11 shows an embodiment of an adaptor used to connect the embodiment according to FIG. 10 to a video preview device.

As mentioned above, an adapter 33 is used in order to connect the off-the-shelf video preview device 32 to the I/O port 28. In FIG. 11, an adapter 33e used to connect the off-the-shelf video preview device 32 to the I/O port 28 of the embodiment shown in FIG. 10 is shown.

In the adapter 33e, the analog video signal is separated from the PoE circuitry by means of a DC-block capacitor 44. Preferably, the capacitor 44 have a specification of >60 VDC. Thus, the adapter 33d is arranged to remove DC-components from the PoE.

What is claimed is:

1. A network enabled digital video camera arranged to be connected to a digital network, the network enabled digital video camera comprising:
    an image sensor arranged to capture digital images;
    an image processor to which the captured digital images are forwarded, the image processor being arranged to render digital video images from the captured digital images;
    a digital network module arranged to transmit and receive digital signals, wherein the digital network module is arranged to transmit and receive basic digital signals that are not additionally modulated by a carrying wave using an input/output port;
    the input/output port being an electrical connector and being connected to the digital network module; and
    an analog video generator, connected to the image processor, arranged to convert the rendered digital video images into an analog video signal and to output the analog video signal;
    wherein the input/output port connected to the digital network module is also being connected to the analog video generator,
    wherein the analog video generator is arranged to generate a basic analog video signal that is not additionally modulated by a carrying wave and transmit the generated basic analog video signal using an input/output port;
    wherein an input and/or output line from the digital network module is connected to an output line from the analog video generator, thereby an analog video signal and a digital signal are transmitted on the same signaling wire.

2. The network enabled digital video camera according to claim 1, wherein the input/output port is connected to an electrical power receiving unit being arranged to receive power via the input/output port, and being arranged to power the network enabled digital video camera.

3. The network enabled digital video camera according to claim 1, further comprising an enable/disable unit arranged to enable/disable the sending of the signal from the analog video generator.

4. The network enabled digital video camera according to claim 3, wherein the enable/disable unit automatically disables the analog video generator when digital signals are transmitted through the input/output port.

5. The network enabled digital video camera according to claim 3, wherein the enable/disable unit automatically enables the analog video generator when no digital signals are transmitted through the input/output port.

6. The network enabled digital video camera according to claim 3, wherein the enable/disable unit is arranged to be enabled/disabled in response to signals received via the digital network.

7. The network enabled digital video camera according to claim 1, wherein the input/output port is a network port.

8. An adaptor, comprising:
    a first modular input/output port arranged to receive a modular connector and to carry digital network traffic in the form of basic digital signals and to carry basic analog video signals through the same signal wires, wherein the basic digital signals are digital signals that are not additionally modulated by a carrying wave and the basic analog video signals are analog video signals that are not additionally modulated by a carrying wave;
    a second modular input/output port, connected to the first modular input/output port, arranged to receive a modular connector and to carry digital network traffic to and from the first input/output port;
    a third output port, connected to the first input/output port, arranged to carry analog video signals from the first input/output port, wherein the third output port is an analog video output port; and
    a separation unit, connected to the first input/output modular port and the third output port, arranged to separate the digital network traffic from the analog video signal, wherein the separation unit is based on a transformer.

9. The adaptor according to claim 8, wherein the third output port is an analog video output port that includes at least one of a BNC connector, an RCA connector and a mini-DIN connector.

10. The adapter according to claim 8, further comprising a battery connected to the first input/output port and arranged to deliver power though said first input/output port.

11. The adaptor according to claim 8, wherein the transformer is a 10/100 BASE-TX transformer.

* * * * *

UNITED STATES PATENT AND TRADEMARK OFFICE
CERTIFICATE OF CORRECTION

PATENT NO.       : 8,208,033 B2  
APPLICATION NO.  : 12/500249  
DATED            : June 26, 2012  
INVENTOR(S)      : Lundberg et al.

Page 1 of 1

It is certified that error appears in the above-identified patent and that said Letters Patent is hereby corrected as shown below:

IN THE CLAIMS

At claim 1, column 13, line 38, after the words "analog video signal using", delete "an" and insert therefore --the--.

Signed and Sealed this
Sixteenth Day of October, 2012

David J. Kappos
*Director of the United States Patent and Trademark Office*